United States Patent [19]
Cunningham

[11] Patent Number: 5,540,409
[45] Date of Patent: Jul. 30, 1996

[54] BEVERAGE CONTAINER HOLDER FOR A DASHBOARD OF A VEHICLE

[76] Inventor: Robert L. Cunningham, 135 Springfield Ave., Newcastle, Wyo. 82701-2222

[21] Appl. No.: 360,168

[22] Filed: Dec. 20, 1994

[51] Int. Cl.[6] ........................................ A47K 1/08
[52] U.S. Cl. ........................... 248/311.2; 224/926
[58] Field of Search ............... 248/311.2; 224/926

[56] References Cited

U.S. PATENT DOCUMENTS

| | | | |
|---|---|---|---|
| D. 326,359 | 5/1992 | Friend | D3/40 |
| 3,842,981 | 10/1974 | Lambert | 248/311.2 X |
| 4,697,780 | 10/1987 | Wenkman et al. | 248/311.2 X |
| 4,852,843 | 8/1989 | Chandler | 248/311.2 |
| 4,941,635 | 7/1990 | Lan | 248/311.2 X |
| 5,052,649 | 10/1991 | Hunnicutt | 224/926 X |
| 5,092,395 | 3/1992 | Amidzich | 248/311.2 X |
| 5,102,085 | 5/1992 | Wieczorer et al. | 248/311.2 |
| 5,114,108 | 5/1992 | Olschansky | 248/311.2 |
| 5,165,646 | 11/1992 | Gewecke | 248/311.2 |
| 5,181,555 | 1/1993 | Chruniak | 248/311.2 |

*Primary Examiner*—Leslie A. Braun
*Assistant Examiner*—Richard M. Smith

[57] ABSTRACT

A beverage container holder for a dashboard of a vehicle including a dashboard of a vehicle having a bore formed therein in communication with the vehicle's air heating and cooling ventilation system; and a holding container for receiving a beverage container having an open top end and a sealed bottom end and with the holding container slidably disposed within the bore of the dashboard, the holding container further having an upper chamber formed therein near the top end, a lower chamber formed therein near the bottom end, an access hole formed between the chambers, a plurality of vents formed thereon for allowing communication between the lower chamber and the ventilation system, and a spring-loaded vent mechanism disposed between chambers and with the vent mechanism depressible when a beverage container is placed thereupon for allowing communication between the chambers through the access hole and with the vent mechanism extendable when a beverage container is removed therefrom for preventing communication between the chambers.

2 Claims, 4 Drawing Sheets

BEVERAGE CONTAINER HOLDER FOR A DASHBOARD OF A VEHICLE

BACKGROUND OF THE INVENTION

1. Field of the Invention

The present invention relates to a beverage container holder for a dashboard of a vehicle and more particularly pertains to allowing a beverage to be heated or cooled by utilizing the vehicle's air heating and cooling ventilation system with a beverage container holder for a dashboard of a vehicle.

2. Description of the Prior Art

The use of beverage containers is known in the prior art. More specifically, beverage containers heretofore devised and utilized for the purpose of allowing a beverage to be held within a vehicle are known to consist basically of familiar, expected and obvious structural configurations, notwithstanding the myriad of designs encompassed by the crowded prior art which have been developed for the fulfillment of countless objectives and requirements.

By way of example, U.S. Pat. No. Des. 326,359 to Friend discloses a beverage cooler-carrier for a vehicle vent. U.S. Pat. No. 4,342,202 to Knutson discloses a beverage cooling apparatus for connection to an auto air conditioner. U.S. Pat. No. 4,852,843 to Chandler discloses a beverage holder for attachment to a vehicle's heating and cooling vent. U.S. Pat. No. 5,165,646 to Gewecke discloses an auto dashboard drink conditioner. U.S. Pat. No. 5,181,555 to Chruniak discloses a portable food and beverage storage unit mounted adjacent an air ventilator.

While these devices fulfill their respective, particular objective and requirements, the aforementioned patents do not describe a beverage container holder for a dashboard of a vehicle that allows a beverage to be heated or cooled yet allows the heating and cooling ventilation system of a vehicle to operate normally when the present invention is and is not in use.

In this respect, the beverage container holder for a dashboard of a vehicle according to the present invention substantially departs from the conventional concepts and designs of the prior art, and in doing so provides an apparatus primarily developed for the purpose of allowing a beverage to be heated or cooled by utilizing the vehicle's air heating and cooling ventilation system.

Therefore, it can be appreciated that there exists a continuing need for new and improved beverage container holder for a dashboard of a vehicle which can be used for allowing a beverage to be heated or cooled by utilizing the vehicle's air heating and cooling ventilation system. In this regard, the present invention substantially fulfills this need.

SUMMARY OF THE INVENTION

In the view of the foregoing disadvantages inherent in the known types of beverage containers now present in the prior art, the present invention provides an improved beverage container holder for a dashboard of a vehicle. As such, the general purpose of the present invention, which will be described subsequently in greater detail, is to provide a new and improved beverage container holder for a dashboard of a vehicle and method which has all the advantages of the prior art and none of the disadvantages.

To attain this, the present invention essentially comprises, in combination, a dashboard of a vehicle having a top wall and a cylindrical bore formed therein and with the bore in communication with the vehicle's air heating and cooling ventilation system. A rigid holding container is also provided and slidably removably disposed within the bore of the dashboard. The holding container has a horizontal circular planar bottom wall, an upstanding tubular sidewall including a bottom end integral with the periphery of the bottom wall, an open top end positioned directly above the bottom wall, and an intermediate elongated portion therebetween. The sidewall of the holding container has an interior surface and an exterior surface. The top end of the holding container has a radial upper flange extended outwardly from the exterior surface and positionable in contact with the top wall of the dashboard when the holding container is slid within the bore. The intermediate portion of the holding container has an annular groove with a generally T-shaped cross-section formed on the interior surface below the top end. A flexible elastomeric gasket is included. The gasket has an outer radial extent secured and form fit within the groove and a tapered inner radial extent projected inwards to define a circular entryway having a diameter of at least 2 $\frac{11}{16}$ inches for snugly receiving a standard-sized beverage can therein and for creating a seal therewith. The holding container has an inner flange extended inwardly from the interior surface below the groove and with the gasket and inner flange thereby defining and demarcating an upper chamber, a lower chamber, and a circular access hole therebetween. The access hole has a diameter of at least 2 $\frac{11}{16}$ inches, and the upper chamber has an axial depth greater than the diameter of the access hole. The lower chamber of the holding container includes a horizontal circular rigid planar plate slidably disposed therein and with the plate having a diameter greater than the access hole. The lower chamber of the holding container also includes a spring disposed therein between the bottom wall and the plate. The spring is extended when unbiased for urging the plate against the inner flange and thereby sealing the access hole. The spring is further retractable when biased for urging the plate away from the inner flange and allowing communication through the access hole. The sidewall of the holding container also includes a plurality of spaced parallel and generally rectangular vents formed therearound at a location proximal to the lower chamber for allowing communication between the lower chamber and the vehicle's air heating and cooling ventilation system. When a standard-sized beverage can is placed within the holding container and onto the plate, the plate is forced downwards to allow communication between the lower chamber and the vehicle's air heating and cooling ventilation system while the upper chamber is simultaneously sealed with the gasket for precluding heated or cooled air from escaping. When the standard-sized beverage can is removed from the holding container, the plate is forced upwards against the inner flange to preclude heated or cooled air from escaping.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved beverage container holder for a dashboard of a vehicle which has all the advantages of the prior art beverage containers and none of the disadvantages.

It is another object of the present invention to provide a new and improved beverage container holder for a dashboard of a vehicle which may be easily and efficiently manufactured and marketed.

It is a further object of the present invention to provide a new and improved beverage container holder for a dashboard of a vehicle which is of durable and reliable construction.

An even further object of the present invention is to provide a new and improved beverage container holder for a dashboard of a vehicle which is susceptible of a low cost of manufacture with regard to both materials and labor, and which accordingly is then susceptible of low prices of sale to the consuming public, thereby making such a beverage container holder for a dashboard of a vehicle economically available to the buying public.

Still yet another object of the present invention is to provide a new and improved beverage container holder for a dashboard of a vehicle which provides in the apparatuses and methods of the prior art some of the advantages thereof, while simultaneously overcoming some of the disadvantages normally associated therewith.

Even still another object of the present invention is to provide a new and improved beverage container holder for a dashboard of a vehicle for allowing a beverage to be heated or cooled by utilizing the vehicle's air heating and cooling ventilation system.

Lastly, it is an object of the present invention to provide a new and improved beverage container holder for a dashboard of a vehicle comprising a dashboard of a vehicle having a bore formed therein and with the bore in communication with the vehicle's air heating and cooling ventilation system; and a holding container sized for receiving a beverage container having an open top end, a sealed bottom end, an interior surface, and an exterior surface and with the holding container slidably removably disposed within the bore of the dashboard, the holding container further having an upper chamber formed therein near the top end, a lower chamber formed therein near the bottom end, an access hole formed between the chambers, a plurality of vents formed thereon for allowing communication between the lower chamber and the vehicle's air heating and cooling ventilation system, and a spring-loaded vent mechanism disposed between chambers and with the vent mechanism depressible when a beverage container is placed thereupon for allowing communication between the chambers through the access hole and with the vent mechanism extendable when a beverage container is removed therefrom for preventing communication between the chambers.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts through the various Figures.

DESCRIPTION OF THE PREFERRED EMBODIMENT

Figure 1:
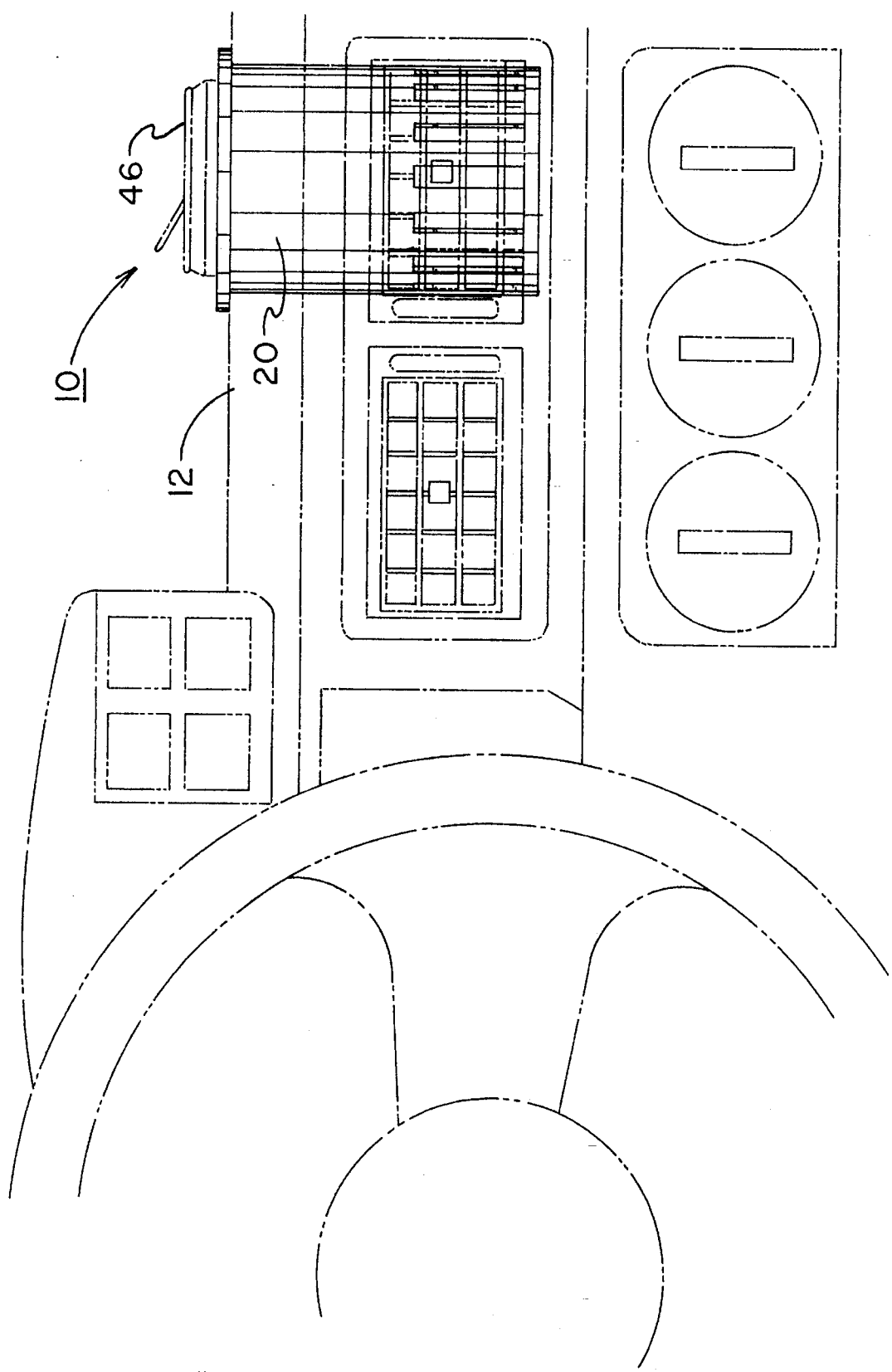
FIG. 1 is a side-elevational view of the preferred embodiment constructed in accordance with the principles of the present invention secured at a location for use with an air heating and cooling ventilation system of a vehicle.

With reference now to the drawings, and in particular, to FIG. 1 thereof, the preferred embodiment of the new and improved beverage container holder for a dashboard of a vehicle embodying the principles and concepts of the present invention and generally designated by the reference number 10 will be described.

The present invention is comprised of a plurality of components. In their broadest context, such components include a dashboard with a bore formed therein in communication with a heating and cooling ventilation system of a vehicle and a holding container. Such components are individually configured and correlated with respect to each other to provide the intended function of allowing a beverage container to be held, and heated or cooled, especially a standard-sized beverage can.

Figure 3:
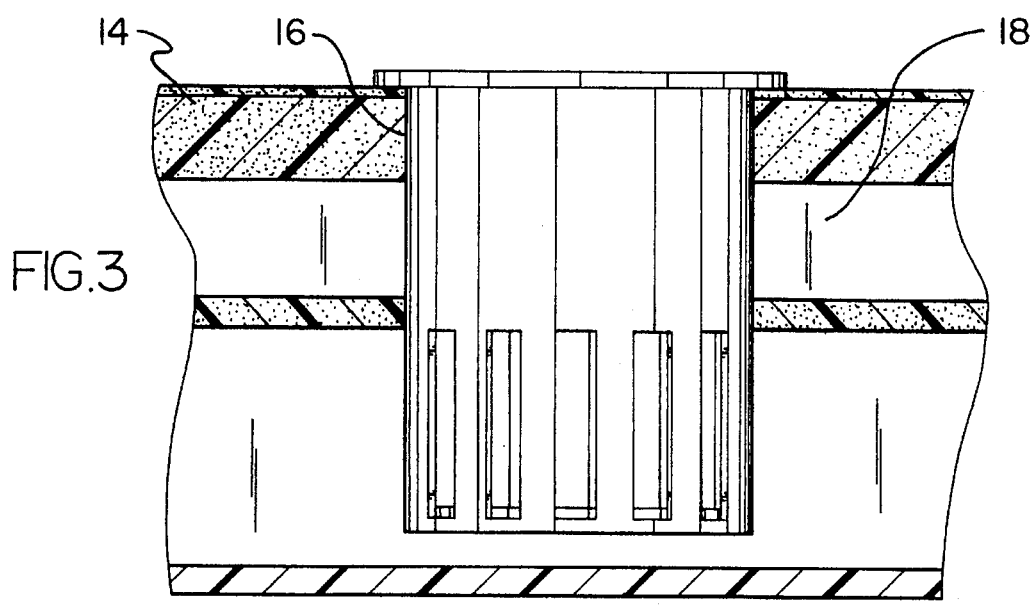
FIG. 3 is a cross-sectional view of the holding container secured within a dashboard of a vehicle.
Figure 4:
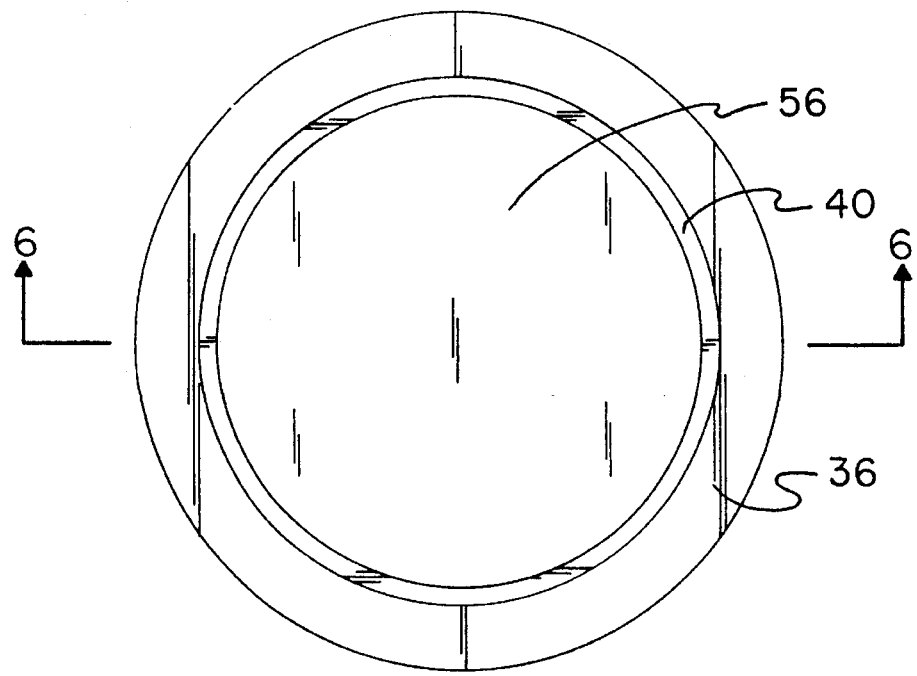
FIG. 4 is a top plan view of the preferred embodiment of the present invention.
Figure 5:
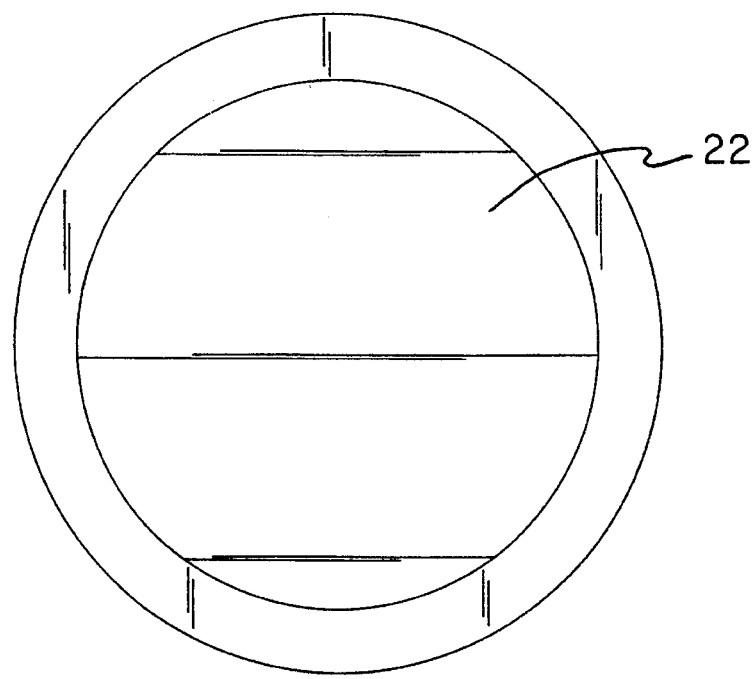
FIG. 5 is a bottom plan view of the preferred embodiment of the present invention.

Specifically, the present invention includes the use of a dashboard 12 of a vehicle as shown in FIG. 1. The dashboard is conventional in structure with a rigid top wall 14 serving as a supporting surface. A cylindrical bore 16 is formed in the dashboard as shown in FIG. 3. The bore is placed in communication with the vehicle's heating and cooling ventilation system 18.

A holding container 20 is also provided. The holding container is generally tubular in structure and formed of a rigid conductive or non-conductive material such as aluminum or plastic, respectively. The holding container is slidably and removably disposed within the bore 16 of the dashboard as shown in FIG. 1. The diametric extent or depth of the bore in the dashboard is large enough to allow passage of cooled or heated air around the holding container and into the interior of the vehicle in a conventional fashion as shown in FIG. 3. The holding container has a horizontal circular and planar bottom wall 22 and an upstanding tubular side wall 24. The tubular side wall has a bottom end 26 integral with the periphery of the bottom wall, an open top end 28 positioned directly above and aligned with the bottom wall, and an intermediate elongated portion 30 therebetween. The side wall also has an interior surface 32 and an exterior surface 34. The top end of the holding container also includes a radial upper flange 36. The flange is integral with the side wall and extended outwardly from the exterior surface thereof. The upper flange is positionable in contact with the top wall 14 of the dashboard when the holding container is slid into the bore such that the holding container is held in a position essentially flush with the dashboard as best illustrated in FIG. 3. The upper flange thus prevents the holding container from being extended too far within the bore.

Figure 7:
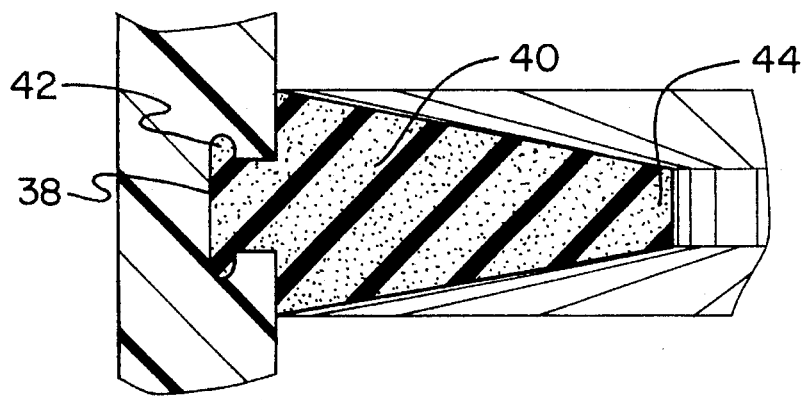
FIG. 7 is an enlarged cross-sectional view of the gasket of the present invention as shown in FIG. 6.
Figure 8:
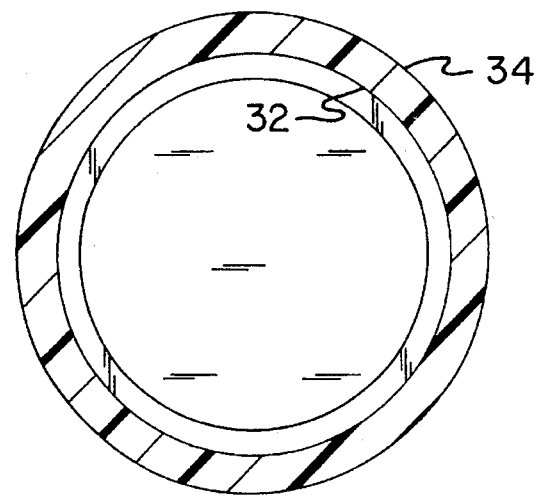
FIG. 8 is a cross-sectional view of the present invention taken along the line 8—8 of FIG. 6.

Referring to FIG. 7, the intermediate portion of the side wall of the holding container also includes an annular groove 38 formed on the interior surface 32 below the top end. The groove has a generally T-shaped cross-section. Also provided is a flexible elastomeric annular gasket 40. Preferably, the gasket is formed of rubber or other such suitable elastomeric material. The gasket has an outer radial extent 42 secured and form fit within the groove and a tapered inner radial extent 44 projected inwards to define a circular entryway. The entryway has a diameter of at least 2 11/16 inches for snugly receiving a standard-sized beverage container 46 therein and further for creating a seal therewith. A standard-sized beverage container is commonly referred to in the canning industry as a 206-type can. The 206-type can has a neck with a 2 6/16 inch upper diameter, a body with a 2 11/16 central diameter and a height of 4 11/16 inches.

Figure 6:
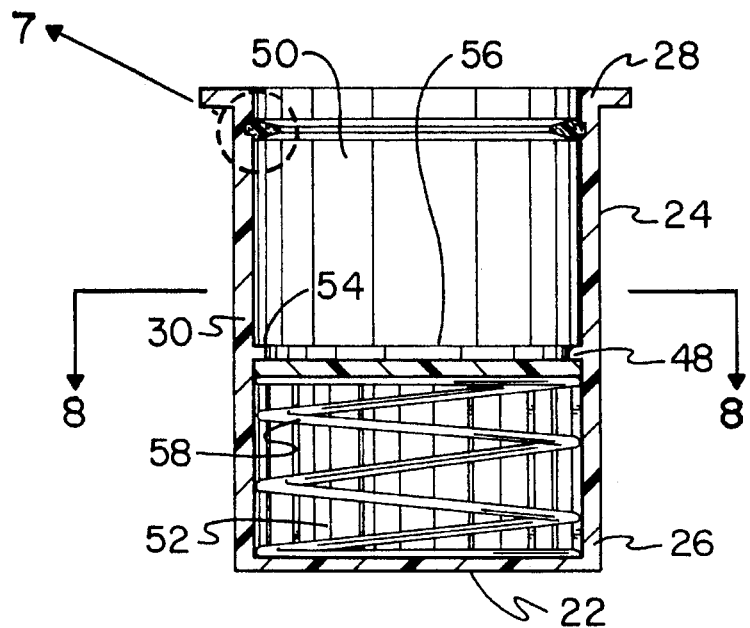
FIG. 6 is a cross-sectional view of the holding container taken along the line 6—6 of FIG. 4.

An inner flange 48 is also included and extended inwardly from the interior surface below the groove 38 as shown in FIG. 6. The gasket 40 and the inner flange 48 thereby define and demarcate an upper chamber 50, a lower chamber 52, and a circular access hole 54 therebetween. The upper chamber and the lower chamber have a generally tubular shape. The access hole has a diameter of at least 2 11/16 inches for allowing receipt of a standard-sized beverage can. The upper chamber has an axial depth greater than the diameter of the access hole. In combination, the upper chamber and the lower chamber have a combined axial length of about 3 11/16 inches. This depth thus allows a standard-sized beverage container to project from the top end of the holding container about 1 inch when placed therein for allowing its ready access for use.

The lower chamber of the holding container includes a valve-type mechanism as best illustrated in FIG. 6. The valve-type mechanism includes a horizontal and circular planar plate 56 slidably disposed within the lower chamber. The plate is formed of a rigid material such as metal or plastic. The plate has a diameter greater than the access hole 54. The valve-type mechanism also includes a spring 58 disposed within the lower chamber between the bottom wall and the plate. The spring is formed of a sufficiently resilient yet expansive-type material such as metal. The spring is extended when unbiased for urging the plate 56 against the inner flange 48 and thereby sealing the access hole 54. The spring is further retractable when biased with a downwardly projected force or weight for urging the plate away from the inner flange and thereby allowing communication through the access hole.

Figure 2:
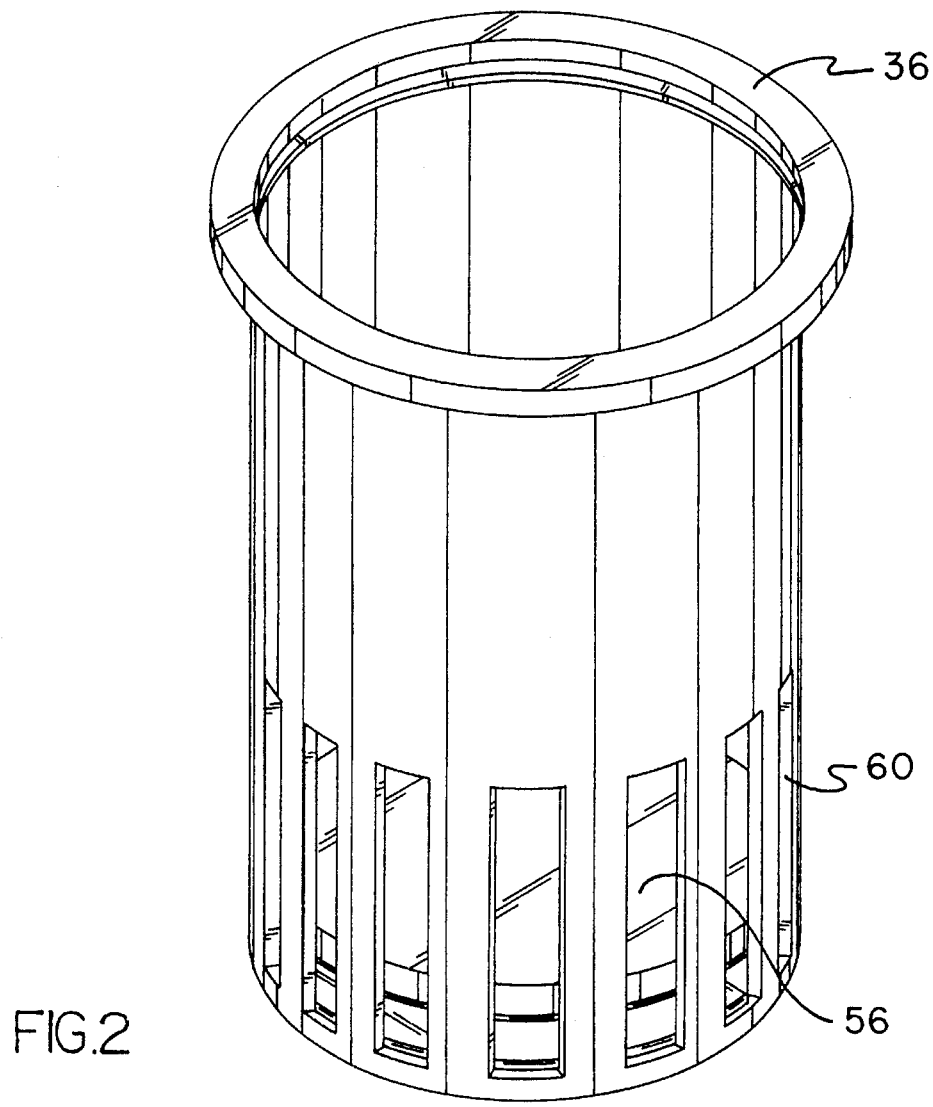
FIG. 2 is a perspective view of the preferred embodiment decoupled from a dashboard of a vehicle.

The side wall of the holding container further includes a plurality of spaced, parallel, and generally rectangular vents 60 formed therearound as best shown in FIG. 2. The vents are positioned proximal to the lower chamber 52 for allowing communication between the lower chamber and the vehicle's air heating and cooling ventilation system 18. When a beverage container such as a standard-sized beverage can 46 is placed within the holding container and onto the plate, the weight of the can forces the plate downwards to allow communication between the lower chamber and the vehicle's air heating and cooling ventilation system. Thus, air is forced upon the can for providing a heating or cooling effect per the discretion of the user. Simultaneously, the upper chamber is closed with the gasket and the beverage can creating a seal for precluding heated or cooled air from escaping, thus enabling a vehicle's vent system to continue to project cooled or heated air into an interior of a vehicle as normal. When the standard-sized beverage can is removed from the holding container, the plate is forced upwards against the inner flange by the spring to seal the access hole. Thus, heated or cooled air from a heating and cooling ventilation system of the vehicle is prevented from escaping, thereby allowing the ventilation system to operate as normal.

The present invention is a beverage container holder for a dash of a vehicle. The beverage container holder utilizes the vehicle's heating and cooling ventilation system to maintain the temperature of hot and cold beverages. The present invention features a cylindrical bore in the horizontal top wall of a vehicle's dashboard. This bore opens into the vehicle's air duct, which provides heated or cooled air that makes the present invention operable. A holding container is provided and an ordinary standard-sized 206-type beverage can would fit almost completely into the holding container, except for an inch or so at the top. A spring-activated valve mechanism formed of a spring and plate automatically closes an access hole when the present invention is not in use. The holding container also has a gasket that contacts the beverage container or can to form a seal for preventing heated or cooled air from leaking out around the holding container.

The user places a standard-sized beverage can upon the spring-loaded valve mechanism within the holding container so that the can slips neatly through the access hole. For cooling a beverage, the vehicle's air conditioning vent is activated, and cool air flowing through the ventilation system to the bore keeps the beverage within the beverage container cool. The bore is made large enough such that air still flows around the beverage can to adequately cool the interior of the car. For heating a beverage, the vehicle's heating system is activated instead. Currently, vehicles produced have no built-in way to accomplish heating or cooling of beverages. The present invention rectifies this situation.

The primary embodiment of the invention as described above relates to a bore in the dashboard of a vehicle for supporting a container. It should be appreciated that the bore for supporting the container could be formed and located in a wide variety of other components of a vehicle, as for example, at or adjacent to the arm rests of the rear side panels of a mini-van. This is in operative proximity to the rear air conditioning\heating available in such region of the vehicle.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by Letters Patent of the United States is as follows:

1. A beverage container holder mounted in a dashboard of a vehicle for allowing a standard-sized beverage can to be heated or cooled by utilizing the vehicle's air heating and cooling ventilation system comprising, in combination:

a dashboard of a vehicle having a top wall and a cylindrical bore formed therein and with the bore in communication with the vehicle's air heating and cooling ventilation system; and a rigid holding container slidably removably disposed within the bore of the dashboard, the holding container having a horizontal circular planar bottom wall, an upstanding tubular sidewall including a bottom end integral with the periphery of the bottom wall, an open top end positioned directly above the bottom wall, and an intermediate elongated portion therebetween and with the sidewall further having an interior surface and an exterior surface, the top end of the holding container further having a radial upper flange extended outwardly from the exterior surface and positionable in contact with the top wall of the dashboard when the holding container is slid within the bore, the intermediate portion further having an annular groove with a generally T-shaped cross-section formed on the interior surface below the top end, a flexible elastomeric gasket having an outer radial extent secured and form fit within the groove and a tapered inner radial extent projected inwards to define a circular entryway having a diameter of at least 2 $11/16$ inches for snugly receiving a standard-sized beverage can therein and for creating a seal therewith, and an inner flange extended inwardly from the interior surface below the groove and with the gasket and inner flange thereby defining and demarcating an upper chamber, a lower chamber, and a circular access hole therebetween and with the access hole having a diameter of at least 2 $11/16$ inches and the upper chamber having an axial depth greater than the diameter of the access hole, the lower chamber of the holding container including a horizontal circular rigid planar plate slidably disposed therein and with the plate having a diameter greater than the access hole, the lower chamber of the holding container further including a spring disposed therein between the bottom wall and the plate and with the spring extended when unbiased for urging the plate against the inner flange and thereby sealing the access hole and with the spring further retractable when biased for urging the plate away from the inner flange and allowing communication through the access hole, the sidewall of the holding container further having a plurality of spaced parallel and generally rectangular vents formed therearound proximal to the lower chamber for allowing communication between the lower chamber and the vehicle's air heating and cooling ventilation system, whereby when a standard-sized beverage can is placed within the holding container and onto the plate, the plate is forced downwards to allow communication between the lower chamber and the vehicle's air heating and cooling ventilation system while the upper chamber is simultaneously sealed with the gasket for precluding heated or cooled air from escaping from the upper chamber, and when the standard-sized beverage can is removed from the holding container, the plate is forced upwards against the inner flange to preclude heated or cooled air from escaping from the upper chamber.

2. A beverage container holder in combination with a component of a vehicle for allowing a beverage container to be heated or cooled by utilizing the vehicle's air heating and cooling ventilation system comprising:

said component of said vehicle having a bore formed therein and with the bore in communication with the vehicle's air heating and cooling ventilation system; and a holding container sized for receiving a beverage container having an open top end, a sealed bottom end, an interior surface, and an exterior surface and with the holding container slidably removably disposed within the bore of the component, the holding container further having an upper chamber formed therein near the top end, a lower chamber formed therein near the bottom end, an access hole formed between the chambers, a plurality of vents formed thereon for allowing communication between the lower chamber and the vehicle's air heating and cooling ventilation system, and a spring-loaded vent mechanism disposed between chambers and with the vent mechanism depressible when a beverage container is placed thereupon for allowing communication between the chambers through the access hole and with the vent mechanism extendable when a beverage container is removed therefrom for preventing communication between the chambers;

the vent mechanism comprises:

an inner flange extended inwardly from the interior surface thereby demarcating the upper chamber and the lower chamber;

a plate slidably disposed within the lower chamber and abuttable against the inner flange;

a spring disposed within the lower chamber between the bottom end and the plate and with the spring extended when unbiased for urging the plate against the inner flange and thereby sealing the access hole and with the spring further retractable when biased by a beverage container for urging the plate away from the inner flange and allowing communication between the upper and lower chambers through the access hole.

* * * * *